United States Patent Office 3,275,687
Patented Sept. 27, 1966

3,275,687
ESTER HYDROLYSIS WITH CATION
EXCHANGE RESINS
Robert I. Leib, Kirkwood, Mo., assignor to Monsanto
Company, a corporation of Delaware
No Drawing. Filed Sept. 18, 1963, Ser. No. 309,868
11 Claims. (Cl. 260—535)

This invention relates to the hydrolysis of esters, and, in particular, to the hydrolysis of aliphatic monohydroxy monocarboxylic acid esters to their corresponding acids.

It is well known in the prior art to prepare aliphatic monohydroxy monocarboxylic acids by cation exchange resin catalyzed hydrolysis of their corresponding esters. However, the heretofore hydrolysis process was slow and provided a sufficiently high conversion only with difficulty.

It has been found that the cation exchange resin catalyzed hydrolysis of aliphatic monohydroxy monocarboxylic acid esters can be improved in both rate and total conversion by the presence of a cation promoter in the reaction mass.

It is therefore an object of this invention to provide an improved cation exchange resin catalyzed hydrolysis process for aliphatic monohydroxy moncarboxylic acid esters.

Further objects and advantages will be apparent from the following description and examples.

According to the present invention, a suitable reaction vessel is charged with an ester having the formula,

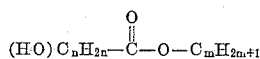

where $m$ and $n$ are integers from 1 to 4, a cation exchange resin, water and a cation promoter. The hydrolysis step is conventional and comprises heating the reaction vessel and contents, with mixing, to a temperature sufficiently high to effect hydrolysis, but below the boiling point of the acid and/or the decomposition temperature of the resin. The alcohol by-product is removed by suitable means, preferably simultaneously with the hydrolysis of the ester, by utilizing a reaction temperature that will distill off said alcohol by-product. The resin is readily separated by conventional means, such as by filtration, and the remaining material is essentially the acid product.

The cation promoter can be introduced into the reaction mass in any convenient manner. For example, the cation promoter, hereinafter referred to as a promoter, can be introduced into the reaction mass by pretreating the resin with a solution or slurry of a suitable salt which is compatible with the resin. Such pretreatment can be accomplished, for example, by heating 10 grams of the wet resin in 200 ml. of water with from 0.1% to 1% of said suitable salt by weight of wet resin for about 1.5 hours at a temperature of from about 55° C. to 75° C. The resin thus treated will possess a level of promoter sufficient to give the desired process improvement. Analysis of such pretreated resin, using conventional methods of qualitative analysis, establishes that at least trace amounts of the promoter ion are present.

Alternately, the promoter can be introduced directly into the reaction mass as a soluble, compatible salt or in its elemental form. However, when utilizing an elemental promoter, it is preferred to circulate small amounts of the liquid portion of the reaction mass through a heated external leg which is provided with a chamber wherein the elemental promoter is deposited. The circulating fluids, which contain the acid product, are thus heated to a temperature sufficiently high to dissolve an adequate amount of the elemental promoter. It is understood that suitable means, such as screens, can be utilized in the reaction vessel to prevent the resin from circulating through the external leg.

The promoter can be selected from the group consisting of metals in Groups IV$b$ and V$b$ of the periodic table, and the salts thereof compatible with the resin, acid and ester thereof, the preferred metal being titanium. The amount of promoter present in the reaction mass will generally be from trace up to about 1% by weight of wet cation exchange resin. It is only necessary that the level of promoter present be sufficiently low so as to avoid poisoning the resin. Simple testing will readily determine the optimum amount required in each case.

The aliphatic monohydroxy monocarboxylic acid esters contemplated within the scope of this invention include the lower alkyl monohydroxy acetates such a α-hydroxy methyl acetate, α-hydroxy propyl acetate, and so on; lower alkyl monohydroxy propionates (alkyl lactates), such as methyl lactate (α-hydroxy methyl propionate), butyl lactate (α-hydroxy butyl propionate), 3-hydroxy propyl propionate, etc.; lower alkyl monohydroxy butyrates, such as α-hydroxy methyl butyrate, 3-hydroxy ethyl butyrate, 4-hydroxy propyl butyrate, etc.; lower alkyl monohydroxy valerates, such as α-hydroxy methyl valerates, 5-hydroxy butyl valerate, etc.; and the like. The preferred compounds hydrolyzed according to the present invention are the α-hydroxy monocarboxylic acid esters, such as methyl lactate.

The cation exchange resin utilized is strongly acidic, generally containing sulfonic or phosphoric acid groups. The preferred cation exchange resin consists of a heat resistant, sulfonated and cross-linked synthetic resin having a polystyrene matrix, such as, for example, one of the cation exchange resins sold under the trade names Amberlite IR–120, Dowex 50 and Duolite C–25.

Although the temperature is not critical, the upper reaction temperature is limited by the stability of the cation exchange resin, and is generally below about 150° C. It is also preferred that the lower operating temperature be sufficiently high to distill off the alcohol by-product. Thus, for example, with methyl alcohol as the by-product, the operating temperature should be sufficiently high to provide a vapor temperature slightly above 64.7° C., the boiling point of said alcohol, and is obtained by a pot or reaction mass temperature of from about 98° C. to 107° C.

While the exact mechanics involved in this particular reaction have not been definitely ascertained, it is believed that the cation promoter ions attach themselves to the resin body via the sulfonic acid functional groups and form complex ions. The promoter, being a polyvalent ion, thus increases the activity per site on the cation exchange resin. The overall activity of the resin is thus increased, resulting in a corresponding increase in the reaction rate and in the conversion rate.

To further illustrate the unexpected advantage obtained utilizing the present invention, the kinetics of the cation resin catalyzed hydrolysis is calculated with and without the addition of a promoter. To simplify the calculation, it is assumed that the acid concentration is constant, the initial water concentration is constant, and the reaction is a first-order reaction. The average K is calculated according to the following equation:

$$\text{Average K (min.}^{-1}) = \frac{2.393 \log \left[\frac{\text{S initial concentration}}{\text{S concentration at time T}}\right]}{T \text{(elapsed time—minutes)}}$$

When S is methyl lactate, from 4 runs utilizing only untreated resin, the average K is calculated to be about 0.0109; utilizing resin exposed to the titanium ion, from 4 runs, the average K for the reaction is calculated to be about 0.0145, or about ⅓ greater.

The details of the process will be more fully understood by reference to the following examples, which set forth representative starting materials, quantities of reactants and reaction conditions. It should be emphasized that such examples are not to be construed as limiting the scope of this invention, but are only for the purpose of illustration.

*Example I*

A suitable reaction vessel equipped with a packed column and an automatic reflux splitter is charged with 104 grams (1.0 mol) of methyl lactate, 72 grams (4.0 mols) of distilled water, and 2.0 grams (wet basis) of titanium-treated Duolite C-25 cation exchange resin. The reactants are heated to from about 98° C. to 107° C., and held there for two hours. The methyl alcohol by-product is removed during this period by distillation. After cooling, a sample of the product is analyzed by gas chromatography. The conversion of methyl lactate to lactic acid is 91.1%. The resin is recovered and thoroughly washed with water. The washed resin is then analyzed according to standard methods of qualitative analysis for the presence of titanium. The test establishes the presence of titanium.

*Example II*

The procedure set forth in Example I is repeated using $VOSO_4 \cdot 2H_2O$ pretreated resin. A sample of the product is analyzed and found to have 92.8% conversion to lactic acid. Qualitative analysis of the washed resin establishes the presence of vanadium.

*Example III*

The procedure set forth in Example I is repeated using $ZrO(NO_3)_2$ pretreated resin. There is obtained 91.2% conversion to lactic acid. Qualitative analysis of the washed resin establishes the presence of zirconium.

*Example IV*

The procedure set forth in Example I is repeated using untreated resin. The conversion to lactic acid is 90.3%. Qualitative analysis of the washed resin is negative for metals in Groups IVb and Vb of the periodic table.

*Example V*

The procedure of Example I is repeated twice using first tetrabutoxy titanate treated resin and then untreated resin with α-hydroxy methyl valerate. An increased yield of α-hydroxy valeric acid is obtained utilizing the titanate treated resin.

*Example VI*

The procedure of Example I is repeated using $Ti(C_4H_2O)_4$ treated resin, and the reaction time is increased to three hours. There is obtained a conversion of methyl lactate to lactic acid of 99.2%.

*Example VII*

A suitable reactor is charged with 2.0 grams $Ti(SO_4)_2$ pretreated resin, 98.72 grams (0.675 mol) butyl lactate, and 50 grams (2.67 mols) water. The reactants are heated to about 40° C.±2° C. and held there for about 31 hours. A sample of the contents, analyzed for free acid content, shows a conversion of 14.9% butyl lactate to lactic acid.

*Example VIII*

The procedure of Example VII is repeated using untreated resin. The conversion of butyl lactate to lactic acid is found to be 13.7%.

*Example IX*

A suitable reaction vessel is charged with 7.0186 grams of wet resin, 520 grams (5.0 mols) of methyl lactate, 1.0 gram of titanium lactate, and 72 grams (4.0 mols) of distilled water. The reactants are heated to from about 98° C. to 107° C., and held there for about two hours, during which time the methyl alcohol byproduct is removed by distillation. There is obtained lactic acid in good yield. The resin is recovered and thoroughly washed. Qualitative analysis of the washed resin confirmed the presence of titanium in the resin.

While this invention has been described with respect to certain embodiments, it is not so limited, and it is to be understood that variations and modifications thereof which are obvious to those skilled in the art may be made without departing from the spirit or scope of this invention.

The embodiments of the invention in which an exclusive property or privilege is claimed are defined as follows:

1. A process for the preparation of monohydroxy substituted monocarboxylic acid which comprises hydrolyzing a compound having the formula,

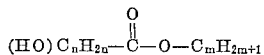

where *m* and *n* are integers from 1 to 4, in the presence of a cation exchange resin catalyst and a cation promoter selected from the group consisting of the metals in Groups IVb and Vb of the periodic table.

2. A process according to claim 1 wherein said cation promoter is titanium.

3. A process according to claim 1 wherein said process is carried out at a temperature sufficiently high to effect hydrolysis, but below the decomposition temperature of said resin and the boiling point of said acid product.

4. A process according to claim 3 wherein said reaction temperature is sufficiently high to effect hydrolysis and distill off the alcohol byproduct, but below the decomposition temperature of said resin and the boiling point of said acid product.

5. A process according to claim 4 wherein said cation promoter is titanium.

6. A process for the hydrolysis of a compound having the formula,

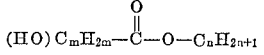

where *m* and *n* are integers from 1 to 4, which comprises reacting said compound with water in the presence of a cation exchange resin catalyst and at least a trace of a cation promoter selected from the group consisting of the metals in Groups IVb and Vb of the periodic table.

7. A process according to claim 6 wherein the cation promoter is titanium.

8. A process for the hydrolysis of a compound having the formula,

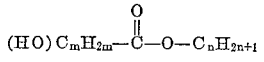

where *m* and *n* are integers from 1 to 4, which comprises reacting said compound with water in the presence of a cation exchange resin catalyst and up to about 1% by weight of said resin of a cation promoter selected from the group consisting of the metals in Groups IVb and Vb of the periodic table.

9. A process according to claim 8 wherein the cation promoter is titanium.

10. A process for preparing lactic acid which comprises hydrolyzing methyl lactate in the presence of a cation exchange resin catalyst and a promoter amount of a cation selected from the group consisting of the metals in Groups IVb and Vb of the periodic table.

11. A process according to claim 10 wherein said cation promoter is titanium and said catalyzed hydrolysis is at a temperature of from about 98° C. to 107° C.

References Cited by the Examiner

Calmon: Ion Exchangers in Organic and Biochemistry, pp. 663–665 (1957).

Duwell: J. Phys. Chem., vol. 63, pp. 2044–7 (1959).

LORRAINE A. WEINBERGER, *Primary Examiner.*

LEON ZITVER, *Examiner.*

D. P. CLARKE, A. P. HALLUIN, *Assistant Examiners.*